Figure 1:
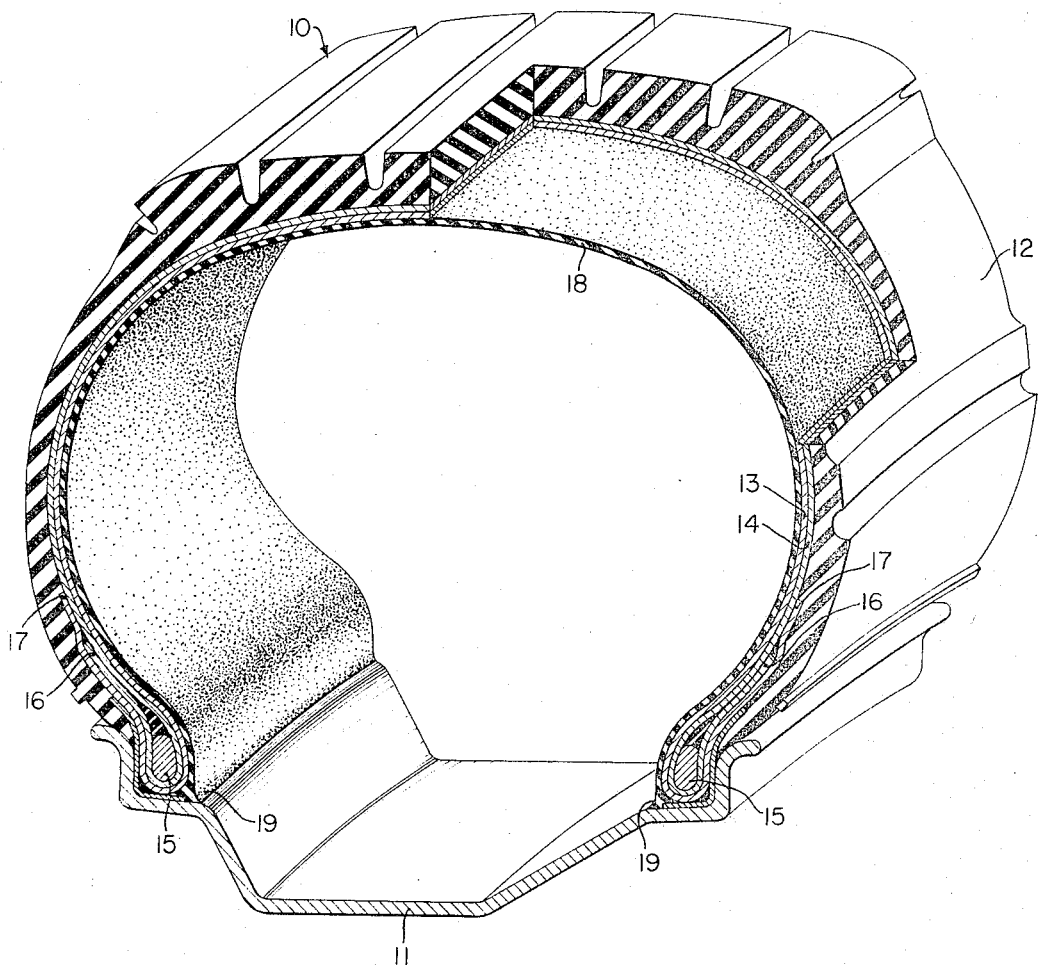

INVENTOR.
HENRY A. PACE
BY
J.B. Holden
ATTORNEY

United States Patent Office 3,299,934
Patented Jan. 24, 1967

3,299,934
LINER FOR PNEUMATIC TIRE
Henry A. Pace, Akron, Ohio, assignor to The Goodyear Tire & Rubber Company, Akron, Ohio, a corporation of Ohio
Filed Apr. 1, 1964, Ser. No. 356,606
2 Claims. (Cl. 152—354)

This invention relates to a liner for a pneumatic tire and in particular relates to an air-impervious elastomeric liner useful in a tubeless tire.

Since the advent of the so-called tubeless tire there has been a constant search to provide a better liner therein. Among the first materials utilized in tubeless tire construction to prevent diffusion of air into and through the tire carcass was natural rubber. As it was later discovered, natural rubber, although it was easily adhered to the tire carcass, did not produce an entirely satisfactory liner in that gaseous diffusion would soon remove a tire from its optimum operating pressures. Another disadvantage of natural rubber is the fact that it exhibits poor aging characteristics. A continued search for a better liner led to butyl rubber, a copolymer of isobutylene with small amounts of isoprene prepared by using an acidic catalyst such as aluminum chloride and polymerized at a rather low temperature level. Additionally butyl rubber generally required the incorporation of carbon black to impart the desired physical characteristics other than air impermeability. Such problems as chafing, lack of adhesion, and frictional deterioration have brought about the combination of butyl rubber and natural rubber or GRS in various combinations, all of which possess inherent disadvantages of one type or another.

The tubeless tire has ordinarily heretofore been constructed with the liner being incorporated in the uncured tire. The liner and carcass are then cured as a unit. Because of the pressures required during the cure cycle great care must be exercised to prevent the cord reinforcement from accidentally being forced through the liner material in local areas, thus providing an avenue of escape for the air contained within the tire during subsequent use.

It has been the practice in the past to equip tubeless tires with tubes when they develop pinpoint leaks, porosity, wicking through the exposed fabric of damaged liners, etc. The above mentioned reasons for air loss through a tubeless tire are exceedingly difficult, if not impossible, to repair in a satisfactory manner. The addition of a tube within a tire often causes objectional heating and actually defeats the purpose underlying a tubeless tire, that is, a unitary carcass and liner combination which acts in unison under various load combinations, particularly compression and bending.

Also, when it becomes necessary to add a tube to a vehicular support assembly such as a tire, the overall cost is increased.

It is therefore the primary object of this invention to provide a hollow elastomeric article having attached thereto an air-impervious liner.

Another object of this invention is to provide a liner that can be combined with a tire carcass subsequent to the curing of the carcass thereof.

An additional object of the present invention is to provide a liner that can be incorporated into a pneumatic tire without vulcanization.

A further object of this invention is to provide a method of lining a pneumatic tire with an air-impervious liner.

A still further object of this invention is to provide a liner which, when damaged, need not be removed from the tire but can be over-coated with a solution of elastomer thus forming a non-laminar new liner.

Figure 2:
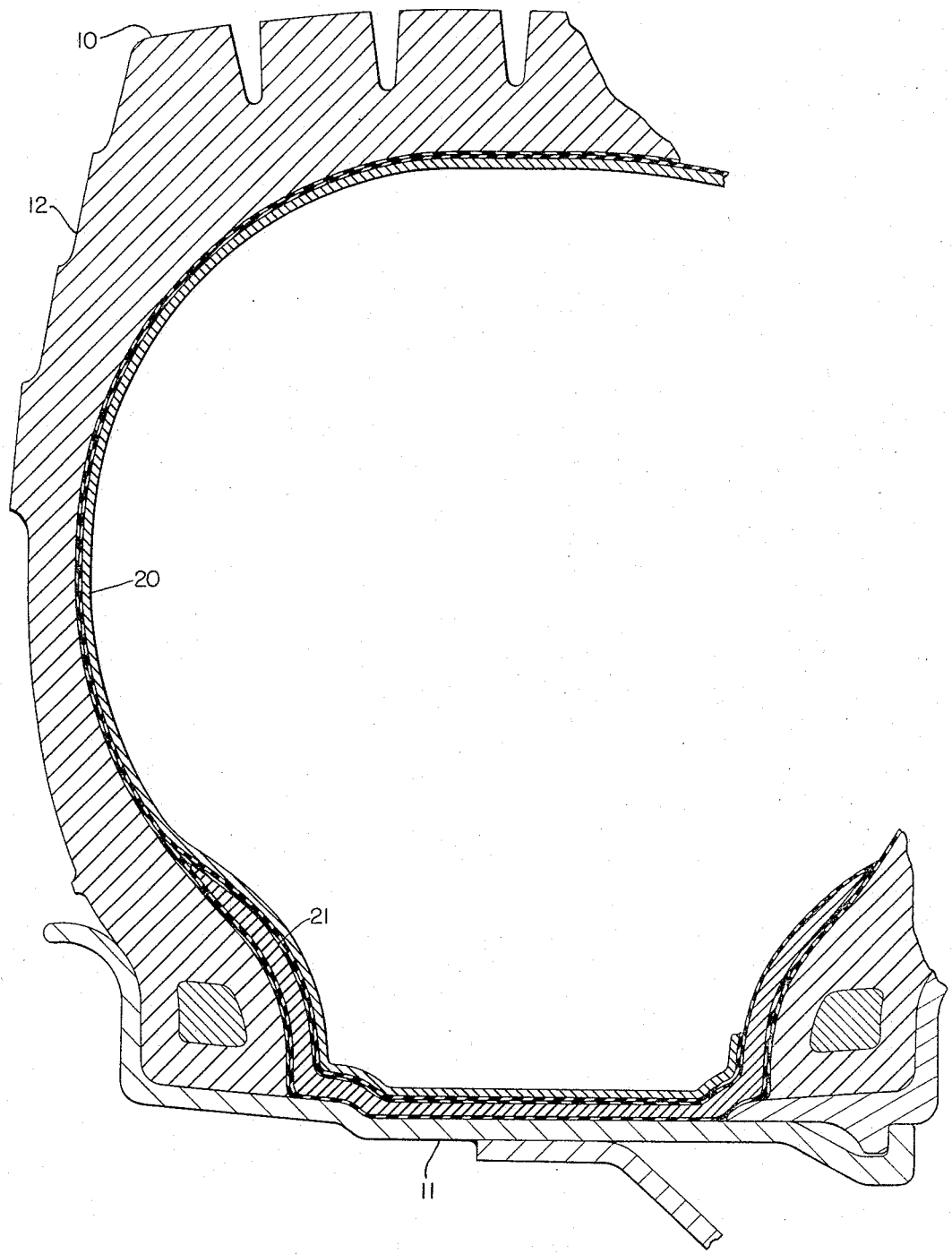

These and other objects of the present invention will be readily apparent from the following description when considered with the accompanying drawings in which FIG. 1 is a prospective cross section of a tire cut away showing the liner therein and FIG. 2 is a cross section through a tire showing the position of the tube relative to the tire and rim.

A tire 10 is shown mounted on a conventional rim 11. The tire carcass 12 is reinforced with cord layers 13 and 14 which extend around beads 15 and terminate on the exterior sidewalls of carcass 12 at ends 16 and 17. An improved air-impervious liner is depicted at 18. The liner 18 extends over the entire internal surface of tire 10 and terminates preferably at bead toe 19. As has been stated before, this invention relates to an improved air-impervious liner that can be applied to the interior of the tire carcass after the tire has been completely vulcanized. In order to carry out this invention a new liner material is employed. The liner is composed of a polyurethane which is unique in that it does not require a curing agent, such as an isocyanate, to be added just prior to the use thereof.

FIG. 2 shows a vehicular load supported assembly comprising a tire member, a tube member 20 positioned within said tire and a flap member 21 interposed between the internal surface of a tire and the external surface of the tube 20, said member having adhered to the external surface a coating of soluble polyurethane to thereby protect said surfaces from the harmful effects of oil and ozone.

Heretofore rubber protectants have been utilized wherein the liner or coating material is deposited from a water base composition. When the polyurethane of this invention is utilized, the reinforcement "cords" or rubber compounds are not adversely harmed by the solvent systems employed as has been observed in water based liner systems.

The polyurethane useful in forming the liner of this invention is completely cured yet is in the form of a solution for convenient application and requires no heat subsequent to the application thereof. The liner is formed simply by evaporation of the solvent thus leaving a film or sheet of completely cured polyurethane elastomer. Since the liner is deposited by a solvent system, it lends itself well to the installation of a second liner coated over the original liner should it be punctured. A complete compatibility occurs between the newly applied solution and original liner thereby resulting in a further enhancement of impermeability by virtue of a heavier lining. Any number of coatings can be applied. This versatility of the new liner provides a method of repairing liners that have been punctured during use. All that is necessary to seal over small holes in the liner is to wipe the interior surface of the liner with a sponge or similar applicator that has been saturated with a solvent such as dimethylformamide or dimethyl sulfoxide. Enough of the original polyurethane liner will be once again put into solution thus filling the small holes, that may exist, in the parent liner material. This method of repairing a tire and liner combination having small leaks therein cannot be employed with conventional tire liners since there is no known solvent that will dissolve vulcanized rubber of the type previously used so that the rubber can be deposited once again as a continuous cross-linked phase. A more complete treatise on the polyurethanes useful in this invention are set forth in U.S. patent application No. 831,056, now Patent No. 3,142,652.

The polyurethane coating is extremely resistant to ozone and oxygen aging. In an ozone aging experiment using an ozone concentration of 1200 p.p.h.m. ozone in the experimental atmosphere, samples were tested statically while under an extension of 20%. Failures because of checking and cracking occurred in less than seven hours exposure in a composite sample of cis-1,4 polybutadiene rubber and SBR rubber as well as natural rubber stock containing 3–4 parts of a good commercial antiozonant. After sixty (60) hours, parallel samples of the polyurethane, containing no antiozonants, had their original appearance, a negligible loss in physical properties and with no detectable checking or cracking. The above set forth test is much more severe than the ordinary test for evaluating the effect of ozone on rubber wherein 2–5 p.p.h.m. of ozone is utilized in the test chamber.

EXAMPLE 1

Into a suitable container was placed 900 grams of a polyester prepared from the condensation of approximately 1.1 mols of a mixed glycol of ethylene glycol, diethylene glycol, and butanediol-1,4 in equal molar quantities with approximately 1.0 mol of adipic acid. This polyester had an hydroxyl number of approximately 60 and an acid number of approximately 1 (resulting in a "reactive number" of 61) and a molecular weight of approximately 1800. To this polyester was added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 60° C. to 63° C. (This partially diisocyanate-modified polyester is called a prepolymer.) To this prepolymer was added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins Sigma-blade mixer and 6.3 grams of a catalyst (the condensation product of 1 mol of aniline and 4 mols of n-butyraldehyde) was added. After mixing for 4 minutes, 27.3 grams of water was added at which time the mixture began to foam, this foam was destroyed by the shearing action of the sigma-blades. Some 3 minutes after the addition of the water, 5 cubic centimeters of N-methyl morpholine (another catalyst) was added. After this mixture had been allowed to mix for a period of approximately 20 minutes in the Baker-Perkins mixer, the formation of elastomer was observed. The mixing was continued for an additional 30-minute period, during which time the elastomer was reduced to a granulated form. This was done to allow ease of handling the removal of the elastomer from the mixer. The granulated elastomer was heated in a 100° C. oven for 60 minutes to complete the cure.

EXAMPLE 2

A mixture consisting of (A) 750 grams of a polyester resulting from the condensation of adipic acid with a mixture containing equimolar quantities of ethylene glycol, diethylene glycol and butanediol-1,4 and having a hydroxyl number of approximately 60, an acid number of approximately 1 and a molecular weight of approximately 1800, and (B) 259 grams of tolylene diisocyanate (98% of the 2,4-isomer and 2% of the 2,6-isomer) was placed in a Baker-Perkins mixer. To this mixture was added 11.2 grams of castor oil. After stirring for approximately 1 minute, 5.3 grams of catalyst (the condensation product of one mol of aniline and four mols of n-butyraldehyde) were added to the mixture. Three minutes later 22.7 grams of water was added, at which time the mixture foamed. The foam was destroyed by the shearing action of the sigma blades. After a short interval (approximately three minutes), 4.1 cubic centimeters of N-methyl morpholine was added. The foaming continued but was constantly suppressed by the action of the sigma blades. The maximum exothermic temperature reached during this reaction was 90° C. Twenty-four minutes after the reaction started the solid elastomer began to form, the mixing being continued to reduce the elastomer to a granular form. The granulated elastomer was placed in a 100° C. oven for 1 hour to complete the cure.

The above cured elastomer can then be dissolved to form solutions that may be utilized for casting coatings, cements, etc. Solvents which have been found particularly useful for forming solutions of the cured elastomer are dimethylformamide, dimethylacetamide, dimethylpropionamide, and dimethyl sulfoxide, or combinations of these solvents. Dimethyl sulfoxide which has a boiling point of 189° C. is one of the better solvents and should be used if production methods can tolerate its slower evaporation rate; however, dimethylformamide (boiling point 153° C.) has been found to be a solvent that fills performance and production specifications in an adequate manner. When dimethylformamide, dimethylacetamide, and dimethylpropionamide are utilized it is usually necessary to incorporate from about 0.1% to about 1.0% of di-n-butylamine in order to bring about complete solution of the elastomer therein. Of the above solvents dimethyl sulfoxide is preferred in many instances since no dissolution agent need be employed in conjunction with the elastomer. In general, solutions up to 50% by weight solids content of elastomer in solvent can be prepared. The solutions become quite viscous above the 50% solids content. For spray applications it has been found that a solids content in the range of 20% to 25% is desirable. When brush applications are considered the solids content should be in the range of 30–35%.

The polymers produced in the practice of this invention are capable of having pigments, fillers, coloring agents and other compounding ingredients incorporated into them according to well-known practices. This can be done at any time or phase of the invention. These materials may be added to the polyester before the reaction has begun, while the polymer itself is being made by adding them to the mixture before the reaction is complete, or they may be incorporated into the solutions of the polymers while they are being made or after they are prepared and ready for use.

The most convenient method for pigmentation is to prepare master-batches of high pigment concentrations by milling the pigment into a 33% solution of the elastomer dissolved in any of the before mentioned solvents on a three-roll paint mill or other similar mixing apparatus. The master-batch thus prepared disperses very readily in the polymer solution to give the degree of pigmentation desired.

In the practice of this invention, the surface of a tire to which the liner is to be applied is thoroughly cleaned so as to remove dirt or harmful release agents that may be present within the tire. A thin coating of the elastomer solution is then deposited on the tire surface. The solution is ideally coated to a wet depth of approximately 0.010 inch so that the ultimate dry thickness will result in a layer as thin as 0.002 inch after the solvent has evaporated. An increased thickness of polyurethane can be deposited without detrimental effect; however, the physical properties of the material are such that heavy coatings are unneccessary.

The liner thus created provides an air cell that is superior to known tire liners. Even though the liner is quite thin, diffusion tests have indicated a 400% improvement in the helium permeability over butyl rubber. Also, the liner does not add appreciable weight to the tire because of its thinness. Since the liner can be added at any time subsequent to the curing of the tire it becomes very versatile. For example, when tubeless tires are operated in areas where there are thorns or cactus barbs, the tire can become saturated with minute holes which defy ordinary repair techniques. Heretofore the only satisfactory method of keeping such a tire in operation was to equip it with a conventional tube.

In addition to an air-impervious coating within a tire, the polyurethane can be utilized as a gaseous barrier in another manner. A thin coating of polyurethane can be applied to the external or outside of the tire thus preventing harmful gasses such as ozone from producing the all familiar check cracking resulting from constant exposure to the atmosphere.

The polyurethane as employed in this invention is particularly useful in preventing checking and cracking of tires which are stored for long periods of time, especially outside. The coating of this invention also is excellent for prolonging the useful life of tires on military vehicles as well as the tires on house trailers which may be raised off the ground for extended periods of time.

Since the polyurethane is quite inert except when in the presence of a few select solvents heretofore mentioned it is an excellent oil barrier. Rubber parts such as tires, tubes, valve stems, flaps, etc. are invariably subjected to oil in one form or another during their normal lifetime. The vulnerable rubber parts when coated with a thin coating of polurethane are protected from the harmful effects of oil.

While certain representative embodiments and details have been shown for the purpose of illustrating the invention, it will be apparent to those skilled in this art that various changes and modifications may be made therein without departing from the spirit or scope of the invention.

What is claimed is:

1. A vehicular load support assembly comprising a tire member, a tube member positioned within said tire, and a flap member interposed between the internal surface of the tire and the external surface of the tube, said members having adhered to the external surfaces thereof a coating of soluble polyurethane thereby protecting said surfaces form the harmful effects of oil and ozone.

2. A tubeless pneumatic tire comprising a toric shaped body having a pair of beads, sidewall portions and a tread, the interior surface of said tire having adhered thereto an air-impervious liner formed from a polyurethane that is installed subsequent to the vucanization of said tire, said polyurethane being fully cured at the time it is adhered to said surface.

References Cited by the Examiner
UNITED STATES PATENTS

| | | | |
|---|---|---|---|
| 1,211,351 | 1/1917 | Price | 156—110 |
| 2,331,795 | 10/1943 | McMahan. | |
| 2,698,042 | 12/1954 | Perkins | 152—362 |
| 2,873,790 | 2/1959 | Cadwell et al. | 156—125 |
| 2,902,072 | 9/1959 | Reuter | 152—330 |

ARTHUR L. LA POINT, *Primary Examiner.*

EUGENE G. BOTZ, *Examiner.*

C. W. HAEFELE, *Assistant Examiner.*